United States Patent [19]

Landino

[11] Patent Number: 4,465,961
[45] Date of Patent: Aug. 14, 1984

[54] MOTOR CONTROL SYSTEM
[75] Inventor: Paul J. Landino, Orange, Conn.
[73] Assignee: Zycron Systems, Inc., Orange, Conn.
[21] Appl. No.: 273,769
[22] Filed: Jun. 15, 1981
[51] Int. Cl.³ .............................................. H02P 5/34
[52] U.S. Cl. .................................. 318/811; 318/810; 318/802
[58] Field of Search ................ 318/811, 810, 800–803; 363/134, 26, 289

[56] References Cited
U.S. PATENT DOCUMENTS

3,971,972  7/1976  Stich ..................................... 318/811
4,239,989 12/1980  Bradger .......................... 323/289 X
4,292,577  9/1981  Cesarz ................................. 318/811

Primary Examiner—B. Dobeck
Assistant Examiner—Patrick Keane
Attorney, Agent, or Firm—DeLio and Libert

[57] ABSTRACT

A motor control system for AC motors utilizing an inverter which is switched to provide pulsewidth modulated DC voltage to be applied to the motor in phase sequence. The pulsewidth modulation is a function of an input reference signal, a signal dependent on motor current and a boost signal operative at low speeds. The motor voltage is continuously regulated as a function of load to provide the necessary power to drive the load.

13 Claims, 10 Drawing Figures

_Fig.3_

_Fig.4_

Fig.7

MOTOR CONTROL SYSTEM

FIELD OF INVENTION

This invention relates to motor control systems and more particularly relates to a motor control system for alternating current motors.

BACKGROUND

Pulse-width modulated motor control systems for AC motors are well known, as exemplified by U.S. Pat. No. 4,052,648, assigned to the U.S. Government, which describes a power factor control for single phase motors over an extended load range of the motor. This concept is widely known and used on many single phase induction motors because it's an easy and inexpensive means of accomplishing voltage control. However, to accomplish this voltage control with a polyphase induction motor becomes much more complicated because of inherent instability problems and leads to a more expensive and less efficient system than the single phase version.

In the area of polyphase AC motors, the introduction of the high voltage Darlington power transistor configuration has lead to the development of three phase inverters whose capabilities provide a variable output as a function of voltage and frequency, which has a linear relationship. As used herein, the term "linear" refers to operating on a linear curve, which is determined by the rated voltage of the motor at rated frequency. Such a curve is exemplified at W in FIG. 1.

The present three phase inverter designs do not easily allow access to the measurement of the power factor angle of the motor, and subsequent regulation of the system to maintain a substantially constant power factor or apparent power factor to maximize economy of operation of the motor.

SUMMARY OF THE INVENTION

The present invention provides a motor control system which gives total command over the frequency and voltage applied to an AC motor, thereby providing control over the speed, and power consumed at or below rated motor load. A system embodying the invention provides control over a three phase AC motor in two separate aspects: first, speed control below, at or above rated nameplate speed of the motor by control of frequency; second, voltage control below, at or above normal operating voltage given a fixed linear voltage-frequency relationship. Operating voltage level will be determined by a given load and/or changing load conditions. This, in essence, provides an apparent constant power factor control of the motor by providing a motor operating voltage as a function of load current.

The motor is operated from a DC source through a pulse-width modulated switching inverter. An analog speed reference signal is converted into a digital signal indicative of a selected speed. An error signal indicative of motor load is utilized to provide a pulse width modulation (PWM) signal for switching of the inverter and such PWM signal is further made a function of a boost signal operative at low speeds and high inertia loads to provide a voltage boost to the motor. The invention further provides new and improved digital logic responsive to the PWM signal and a fault signal, or the absence thereof to control switching of the inverter with a time delay introduced between switching signals of a phase of guard against short circuiting a motor phase.

An object of this invention is to provide a new and improved motor control circuit for a polyphase AC motor utilizing pulsewidth modulation techniques.

Another object of this invention is to provide a motor control system of the type described, having new and improved means for regulating the voltage applied to a polyphase AC motor to maintain constant speed at a given or varying load.

A further object of the invention is to provide new and improved logic means in a system of the type described for switching the inverter to provide a given speed of and regulation of the voltage applied to the motor.

The features of the invention which are believed to be novel are particularly pointed out and distinctly claimed in the concluding portion of this specification. The invention, however, both as to its operation and organization, together with further objects and advantages thereof, may best be appreciated by reference to the following detailed description taken in conjunction with the drawings.

DESCRIPTION OF THE DRAWINGS

FIG. 6 is a diagram, partly schematic and partly in block form, of the frequency control system of FIG. 3;

DETAILED DESCRIPTION OF AN EMBODIMENT OF THE INVENTION

Figure 1:
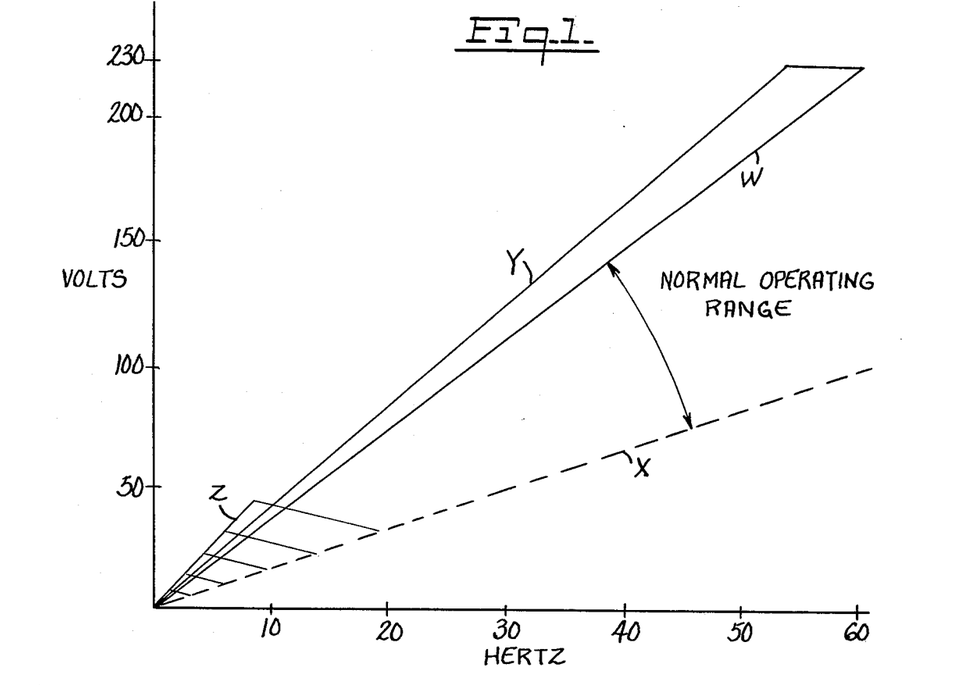
FIG. 1 is a graphical representation of various operating conditions of an AC motor as a function of frequency and voltage.

In FIG. 1, curve W shows a linear volts/frequency relationship where operation is at rated voltage and rated frequency. The curves of FIG. 1 are representative of a motor rated at 230 Volts at 60 Hertz. In operation along this curve at full speed, full rated voltage will be applied; at half speed, half the rated voltage is applied. Curve X represents a minimum operating volts/hertz curve and, as shown, represents a maximum possible reduction of motor voltage to forty percent. Normally, at any given operating frequency, the motor output voltage will be between the curves W and X, depending upon motor load conditions. Under changing speed conditions, the voltage, upon acceleration, will lead the frequency above the normal curve W, as shown by curve Y. This voltage leading condition permits excessive torque to be developed at the motor shaft to assist in the acceleration of loads where high inertia conditions exist. To achieve this, the invention provides a new and improved power accelerator as hereinafter explained. To supplement the power accelerator, there is a further circuit known as a "boost" circuit which provides a increase in nominal motor voltage, but is only effective below a predetermined level of the maximum operating frequency. This new and improved boost circuit as hereinafter explained, is provided to effectively start high inertia loads and the operation of the boost circuit is shown within the shaded area Z.

Figure 3:
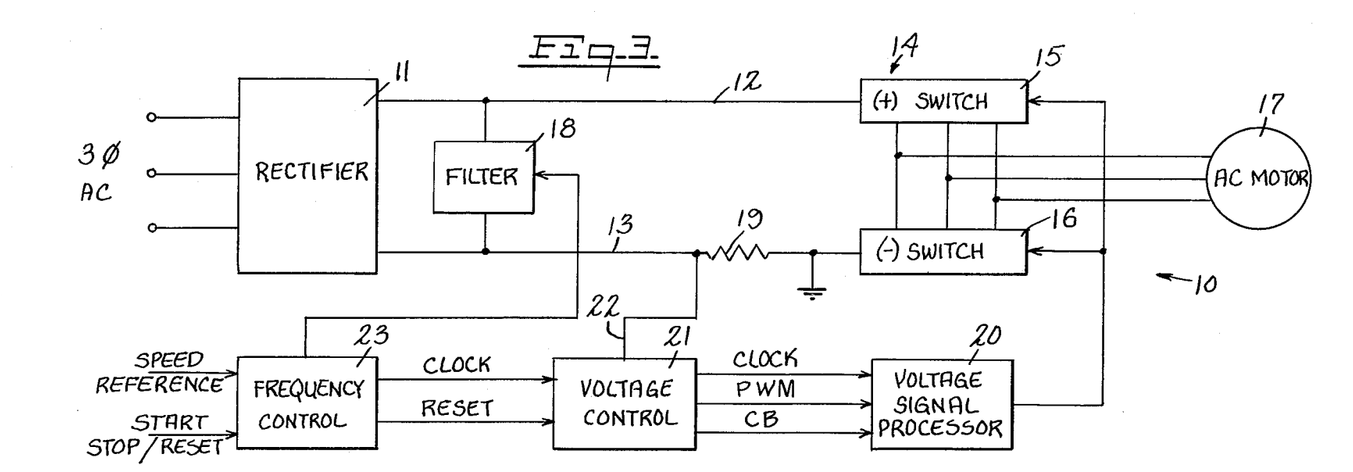
FIG. 3 is an overall block diagram of a system embodying the invention.

Referring now to FIG. 3, which illustrates in block form a system 10 embodying the invention, three-phase AC energy is applied to a rectifier 11 and the resulting DC is applied on positive and negative buss lines 12 and 13 to an inverter 14 which includes a positive switching network 15 and a negative switching network 16. A three-phase output is derived from the inverter and applied to a three-phase AC motor 17. A filter 18, hereinafter described is connected between lines 12 and 13.

Line 13 also includes a current sensing resistor 19 whose function is hereinafter described. Switching of the inverter 14 is controlled from a voltage signal processing network 20, which receives clock, pulse width modulated (PWM) and current breaker (CB) inputs from a voltage control network 21. Voltage control network 21 receives a signal indicative of line current at resistance 19 over a line 22 and also a speed reference signal and reset signal from a frequency control network 23. Frequency control network 23 receives, as an input, a speed reference signal and also a start-stop/reset command.

The frequency control network 23 will determine the speed of operation of the motor 17. The voltage control network 21 will determine the voltage applied to the motor 17 through pulsewidth modulation. The signal processor network 20 will determine the switching time of the inverter, both as to frequency and duty cycle per period.

The voltage signal processor 20 is slaved to the voltage control network, whose function is to take the incoming control frequency signal and determine the proper operating voltage as called for by an apparent power factor error signal. The voltage control network establishes the correct duty cycle of the width modulated pulse, thereby establishing voltage to the motor. This PWM signal is passed along with a clean frequency signal of the clock to the voltage signal processor. The voltage control network also has the option of providing an established output voltage at low speed (boost), thereby giving additional torque to the motor for greater than normal break-away torque under high inertia load conditions. The voltage control network also has a function of monitoring motoring current to provide a circuit breaker in cases of overload, whereby it may shut down the entire system.

The frequency control network has the function of controlling the speed of the motor. Its input comprises a variable or fixed DC level signal which determines its maximum variable or fixed running speed. This input also provides a means for starting and stopping the motor via the frequency control at an established acceleration or deceleration rate.

Figure 4:
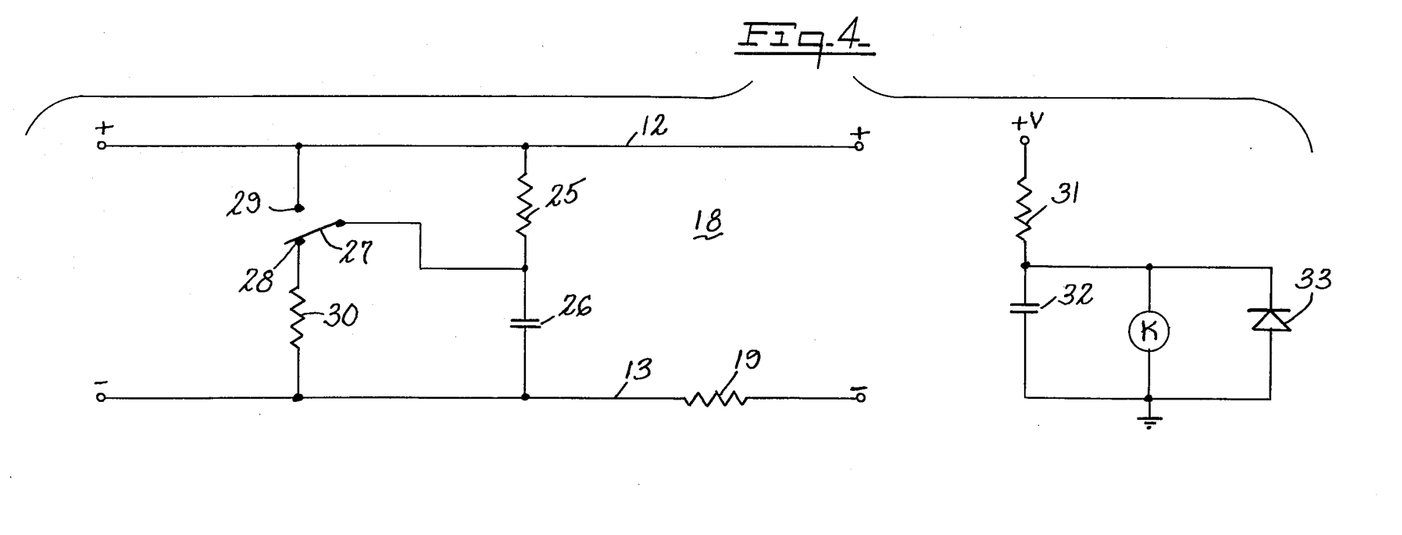
FIG. 4 is a schematic diagram of a filter network utilized in the invention.

Reference is now made to FIG. 4.

Filter 18 comprises a resistance 25 and a capacitance 26 in series across lines 12 and 13. A relay contact 27 extends from between resistance 25 and capacitance 26 to either of terminals 28 or 29. Terminal 29 is connected through a resistance 30 to line 13.

DC power from rectifier 11, which may be a high voltage on the order of three hundred volts, is initially applied to filter capacitor 26 via resistance 25, causing capacitor 26 to begin charging. When the system is started, after a fixed period of time determined by resistance 31 and capacitance 32, a relay K is energized and picks up contact 27 to short out resistance 25 and directly connect capacitor 26 across lines 12 and 13 to act as a filter. This is referred to as a power-up sequence and protects the input fuses from blowing upon power being applied. A free wheeling diode 33 is connected across relay K.

Figure 5:
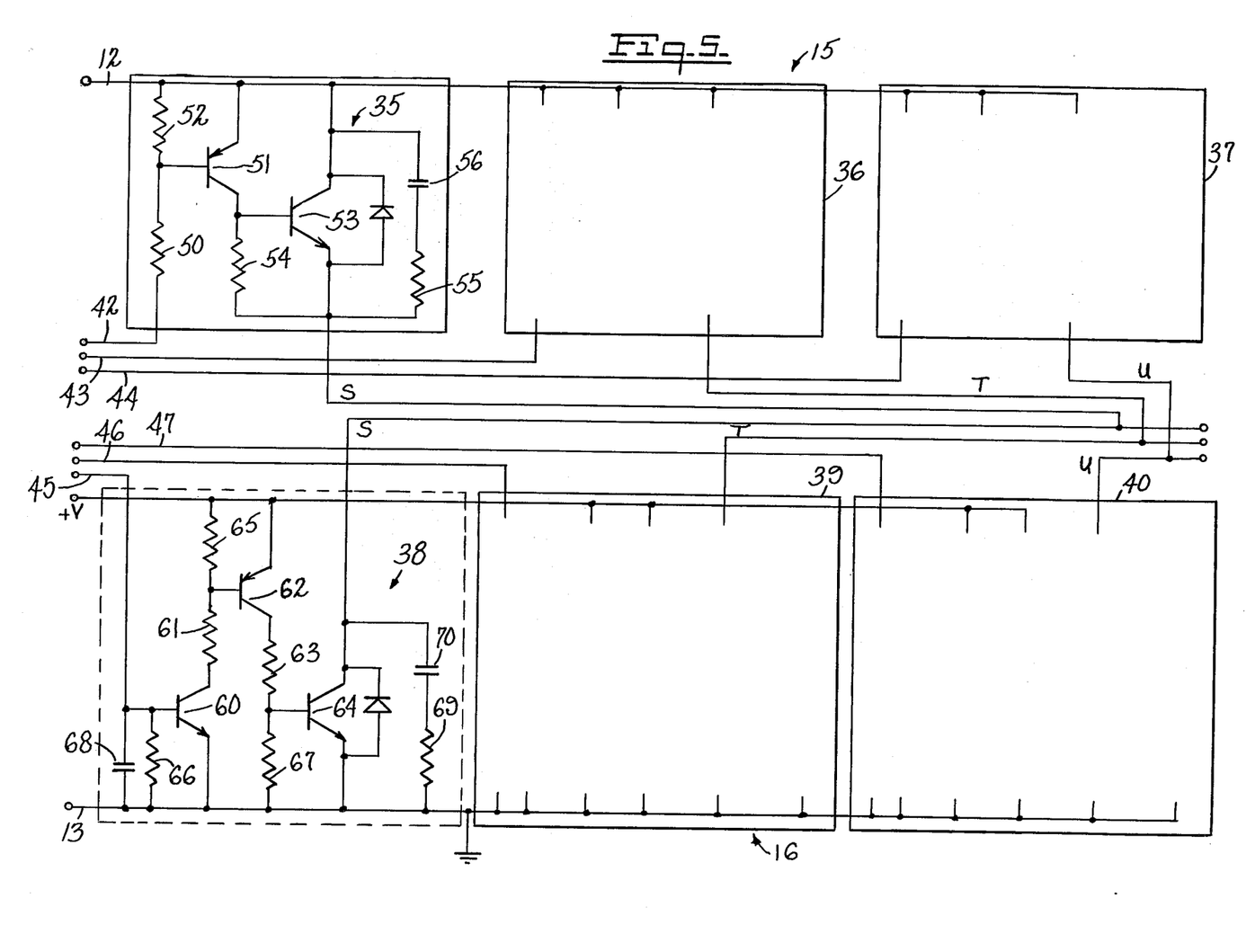
FIG. 5 is a diagram, partly schematic and partly in block form, of the inverter of FIG. 3.

As shown in FIG. 5, inverter 14 comprises a positive switching section 15 in the form of modules 35, 36 and 37, which are identical and only module 35 is shown. The negative switching section 16 comprises three modules 38, 39 and 40, which are identical and only module 38 is shown schematically.

When switched in the proper sequence, the modules will provide three-phase rectangular waves of voltage to motor 17. Under constant load conditions, the motor speed will be directly proportional to the operating frequency at which these switches are sequenced. At no point in time are any two opposite switches on, or a direct short across the positive and negative busses would exist. Accordingly, a time delay in switching is introduced, as hereinafter disclosed.

Positive switch gating inputs are applied over lines 42, 43 and 44. Inputs to the negative switching modules are applied over the lines 45, 46 and 47. Outputs of the switches are represented as S, T and U. The control lines 42-47 extend from the voltage signal processor 20. When the switches 35, 36 and 37 are off, the control lines 42-44 are floating. When the switches 35-37 are closed or on, positive buss 12 is tied to negative buss 13 through the motor and the negative switching modules.

Considering switch module 35, when control line 42 is in an OFF state or floating condition, no current will flow through resistance 50 and therefore, transistor 51 will not conduct. Resistance 52 is a base clamp. Since no collector current is flowing in transistor 51, no base current is applied to transistor 53. Therefore, no phase current flows from the positive buss 12 of the motor phase S. When an ON signal is applied to line 42, current begins to flow through resistor 50. This in turn causes transistor 51 to turn ON to a saturated state and collector current begins to flow, providing base current to power transistor 53. As transistor 53 turns on, its collector voltage approaches saturation level. As it approaches this level, its base drive begins to diminish since it is driven directly from the collector voltage via saturated transistor 51. This situation causes the power transistor 53 to always sit at the threshold of saturation with minimal base drive. Since this technique does not lead to high frequency operation, all three positive modules are only statically switched for motor operating frequency.

Resistance 54 is a base clamp for power transistor 53. Resistance 55 in series with capacitor 56 acts as a snubbing network, limiting the rate of rise of the voltage across transistor 53.

The output lines of the negative switching modules are tied directly to the outputs of the positive switch modules, as shown on the lines S, T and U. The switch control signals are received over lines 45-47 from the signal processor 20.

The application of a positive voltage with respect to negative buss 13 will cause the switches 38, 39 and 40 to turn ON and connect the motor phases to negative buss 13.

Referring now specifically to switch module 38, when an ON control signal is received on line 45, it provides base current to a transistor 60, and collector current begins to throw flow through base resistance 61 of transistor 62 from a DC supply line, causing transistor 62 to saturate. This, in turn, provides a collector current which flows through resistance 63 to the base of power transistor 64. Resistances 65, 66 and 67 are base clamp resistances while capacitor 68 is a noise filter capacitor.

Resistance 69 and capacitor 70 act as a snubbing network to limit the rate of rise of voltage across power transistor 64 and maintain it within a safe operating range.

The circuit is designed to provide a high base drive so that high switching speeds can be obtained. This is necessary since all three of switches 38, 39 and 40 are not only statically switched to determine the operating speed of motor 17, but are also pulsewidth modulated to provide a variable voltage to the motor. The pulsewidth modulation is accomplished only in the negative switching modules.

Reference is now made to FIG. 6, which shows the frequency or speed control network 23. A DC signal is picked from a potentiometer 72 and applied to a speed signal generator 73. Speed signal generator 73 is a conventional circuit including a resistance-capacitance network to control the rate of change of the signal applied to a voltage controlled oscillator 74. The output of generator 73 under steady state conditions will be the same as or directly proportional to the voltage picked off potentiometer 72. The speed signal is first applied to an operational amplifier 75 via a resistance 76. Amplifier 75 provides a constant current source for a transistor 77 via the base resistor 78. A timer 79, which may be an integrated circuit type LM555C, is set up as a monostable oscillator. The constant current source of transistor 77 causes a capacitor 80 to charge at a linear rate through resistances 81 and 82. As the voltage across capacitor 80 increases to the internal trigger level of circuit 79, the pin 3 output goes low and pin 7 goes low, causing capacitor 80 to discharge through resistance 82 until it reaches a lower trigger level, at which point pin 3 goes high and pin 7 goes back into an open state, allowing capacitor 80 to begin recharging.

Figure 2:
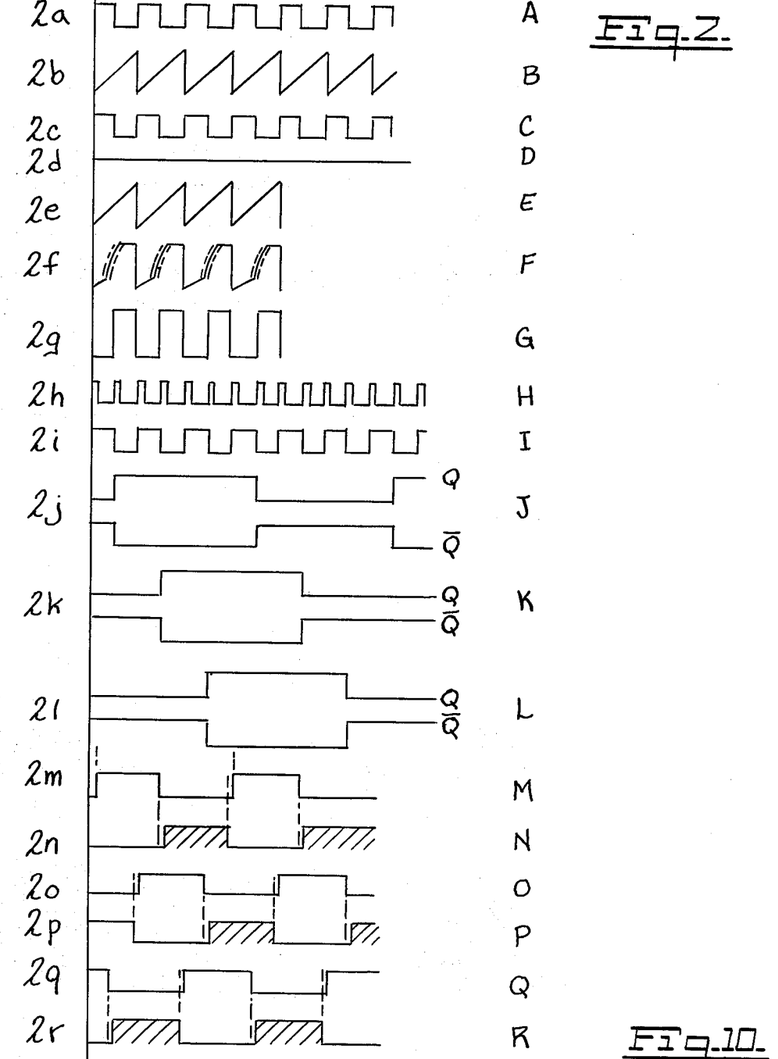
FIG. 2 depicts wave forms that occur in the system.

When the output of pin 3 goes low, a light emitting diode (LED) of a opto-isolator 83 is forward biased and current flows through resistance 81. When the output of circuit 79 goes high, zero current flows. The amount of time the output of circuit 79 is low is determined by the discharge time constant of capacitor 80 and resistance 82. This ON time is adjusted so that it is equal to a given percentage, for example, forty percent of the duty cycle of the resulting rectangular wave signal. This is the basic clock signal A and is shown in FIG. 2a.

Start-stop and reset of the system is accomplished through a circuit 83a. To start the system, start switch 84 is closed and current flows through resistance 85 and relay 86. When relay 86 is energized, it picks up its contact 86a latching the relay. Upon the opening of Stop/Reset switch 88, relay 86 is dropped out and contact 86a goes to its normal position, as shown. The LED of opto-isolator 89 will emit light when contact 86a is in its normal position to reset and activate a circuit breaker circuit hereinafter describes. At the same time, a transistor 91 is turned on via base resistance 92, causing a positive voltage to be applied to an amplifier of speed signal generator 73 to discharge the timing capacitance therein, and immediately reset the circuit.

Figure 7:
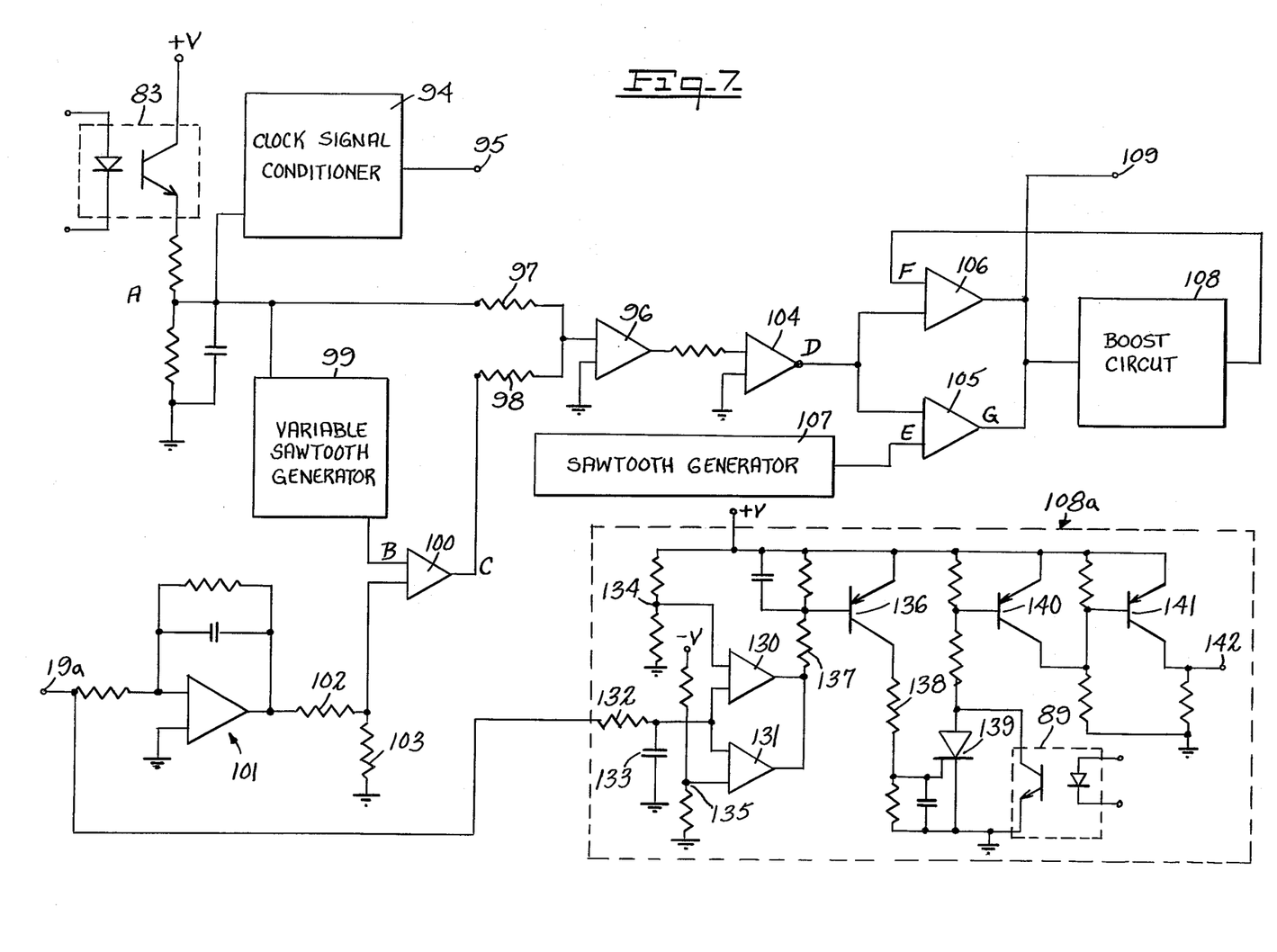
FIG. 7 is a diagram, partly schematic and partly in block form, of the voltage control system of FIG. 3.

The output of the transistor of opto-isolator 83 is a clock signal A having a frequency proportional to the voltage picked off potentiometer 72. As shown in FIG. 7, the output of opto-isolator 83 is applied to a clock signal conditioner 94 which squares off the basic clock signal and provides a conditioned clock signal at terminal 95. Signal A is also applied to an operational amplifier 96 via a resistor 97 where it is summed with an error correction signal applied through resistance 98.

Clock signal A is also used to control a variable sawtooth generator 99. Sawtooth Generator 99 provides a ramp signal B having a period equal to the period of the clock (FIG. 2b). This ramp output signal is applied to a voltage comparator 100 where it is compared with an incoming analog signal D (FIG. 2d) from terminal 19A (FIG. 3) indicative of DC buss current. The DC buss current indicative signal is a DC voltage whose amplitude is proportional to the current in buss line 13. The signal is applied to an operational amplifier 101 where it is inverted, filtered and amplified to a DC level and applied to a voltage divider network comprising resistance 102 and 103. This signal is compared with the variable sawtooth generator signal in voltage comparator 100 which generates a pulsewidth modulated error signal C on the output of comparator 100 (FIG. 2c). Signal C is applied through resistances 98 to operational amplifier 96. The signal C is proportional to the selected operating frequency, and the load on the motor.

The arrangement of the input to operational amplifier 96 is important to the power acceleration function at low motor speeds. The signal A is a result of the selected speed from the speed control potentiometer 72. It comprises a frequency with a selected duty cycle per period. The duty cycle is initially set at a predetermined value, for example, forty percent of the period. The duty cycle is defined as the amount of time signal A is high over the period of one cycle. If the signal at resistance 98 was not present, the output volt/hertz curve would be line X of FIG. 1. Without an error signal C from comparator 100, the motor would be operating at a reduced volts/hertz curve. This, assumed example, sixty percent reduction is a result of the value selected for resistances 97 and 98.

Consideration, to this point, is that the error signal C from comparator 100 has not been introduced into the summing operational amplifier 96. With the motor full loaded, it is desired that the error signal C be capable of correcting the voltage to its nominal value as shown by the Line W, FIG. 1. The signal C is selected such that the maximum duty cycle that can be obtained during a period of the clock is ninety-five percent (assuming maximum operating frequency) when the motor is operating in excess of a given value of full load, for example, one hundred fifteen percent. Resistance 98 is selected to provide an error signal which results in a volts/hertz curve W, FIG. 1, with the motor operating at full load.

Operational amplifier 101 is selected to saturate if the motor load exceeds a given percentage, for example, 115 percent of full load. Therefore, error signal C remains at the aforementioned duty cycle of 95%.

The value of resistances, 102 and 103, are selected to produce an output from amplifier 101, which given the stated overload condition, will saturate its output. The reason for causing amplifier 101 to saturate is so that the error signal C cannot apply an excessive amount of voltage to the motor at any given frequency. When accelerating the motor quickly or with a high inertia, the excessive overload causes the above normal volts/hertz line Y to be applied, which generates additional torque needed to accelerate the motor faster at lower speeds. Normally, a slower accelerating rate would be necessary, given the same conditions without the above described power accelerator feature.

As the applied frequency to the system changes, so does the signal output from variable sawtooth generator 99. This permits the generation of the proper error signal C regardless of operating frequency. It also allows for additional voltage to be applied in an overload condition. The saturation of amplifier 101 always assures that at no time will excessive voltage be applied to the motor.

After PWM signal C is summed with clock signal A via resistors 97 and 98 into operational amplifier 96, the signal is amplified, filtered and inverted. The resulting signal is then applied to operational amplifier 104 where it is again amplified and filtered and inverted to provide an analog signal D. The output of amplifier 104 is a DC level signal D (FIG. 2d) corresponding in amplitude to the necessary output voltage needed at motor 17. The amplitude of this voltage is a function of commanded motor speed and motor load. Signal D is then applied to two voltage comparators, 105 and 106, whose outputs are OR'ed together to provide a pulsewidth modulated signal, which is applied to the voltage processing network 20. Voltage comparator 105 compares analog signal D with a sawtooth wave form E (FIG. 2e) frequency to generate a PWM output G (FIG. 2g). The sawtooth wave form E is derived from a sawtooth wave form generator 107.

Voltage comparator 106 compares signal D with a two-ramp sawtooth waveform F (FIG. 2f) as hereinafter described, which is used to generate the boost portion of the volts/hertz curve shown in FIG. 1.

The voltage control network further comprises a circuit breaker network 108a, hereinafter described.

Figure 8:
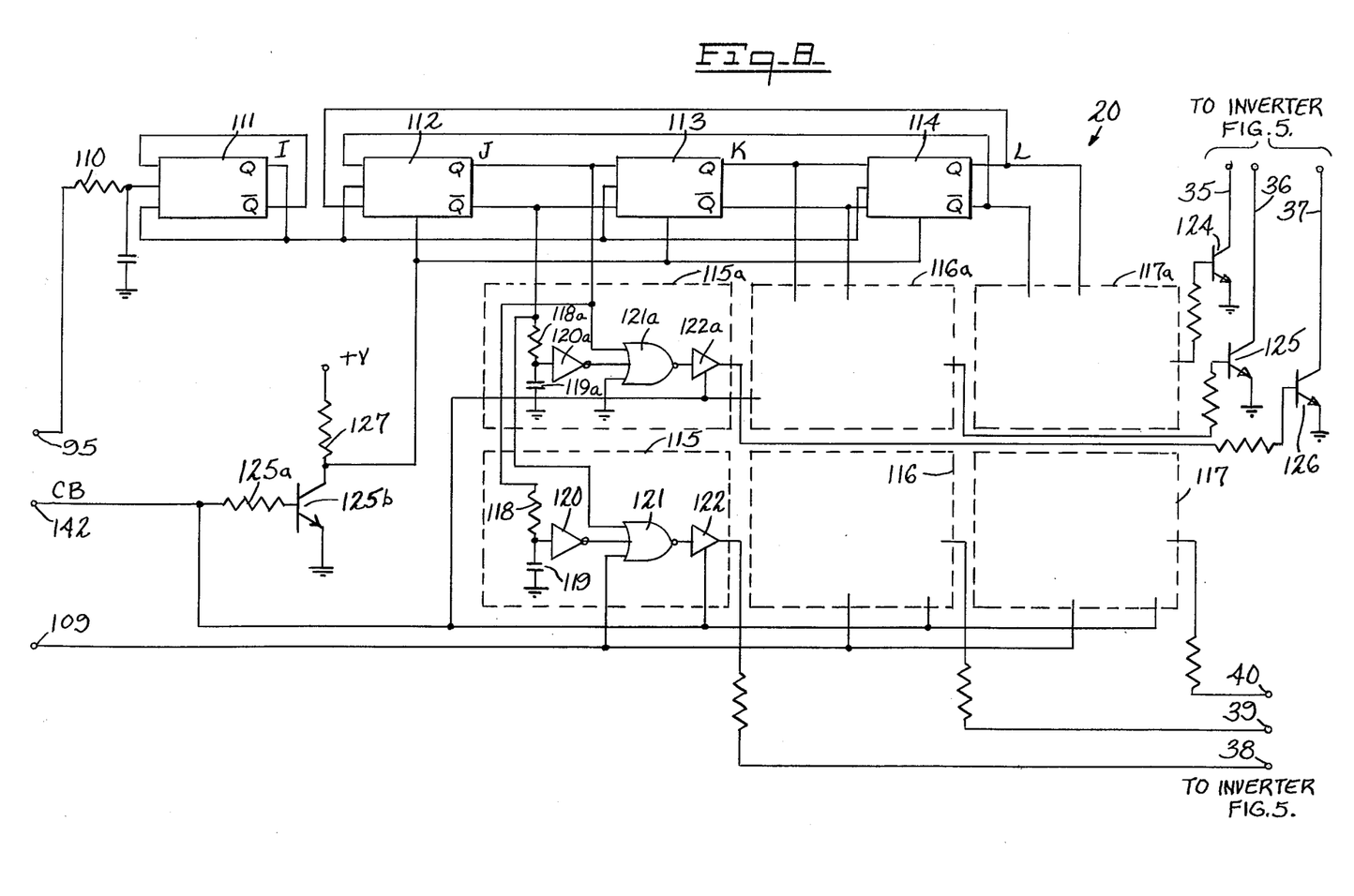
FIG. 8 is a diagram partially schematic and partially in block form, of the switching logic of FIG. 3.

Reference is now made to FIG. 8, which exemplifies the voltage processing network 20. This network has the function of controlling the proper sequence of signals to the switching modules of the inverter 14 to provide the proper three-phase output.

The incoming clock signal from conditioner 94 is a rectangular wave which has a fixed ON time and a variable period. The clock signal is shown in reduced scale in FIG. 2h as it appears at terminal 95 from the clock signal conditioner. It's maximum frequency is equal to a predetermined factor of the motor operating frequency, for example, twelve times, and its duty cycle may be approximately forty percent at maximum frequency. The incoming clock signal from terminal 95 is applied via a resistance 110 to a flip-flop 111 which is cross-coupled and provides on its Q output a square wave signal I (FIG. 2i) whose frequency is one-half of the input clock signal. Three additional flip-flops, 112, 113, and 114 are connected to form a three-stage shift register, using inverse feedback to form a shift counter. The three clock inputs of the shift counter, flip flops 112, 113, and 114 are tied directly to the Q output of flip-flop 111. The output wave forms J, K, L of the shift counter are shown in FIGS. 2j, 2k, and 2l. There is a phase shift between counter outputs, which provides the basis for the three-phase generation. Each of the Q outputs are fed directly to a delay circuit 115, 116, 117 for the negative switching modules 38, 39, 40, respectively. The $\bar{Q}$ outputs are applied to delay circuits 115a, 116a, and 117a. Each delay circuit comprises a resistance 118 and a capacitance 119, which causes a short delay, for example, one hundred microseconds in the final output to the switch modules only during turn-on of the original signal pattern generated by the shift counter. The delay circuit is also used as a means of directing the PWM signal to the negative switch modules.

Each delay circuit 115, 116, 117 further comprises a Schmidt trigger 120 providing an inverted (low) output, a three input Nor gate 121 and a buffer-driver 122. The outputs of circuits 115, 116, and 117 are applied to the control lines of inverter switch modules 38, 39, and 40. Each Nor gate 121 receives a Q and $\bar{Q}$ signal from an associated flip-flop 112, 113, or 114, and a PWM signal F from voltage control network at terminal 109.

Since each delay circuit is identical, only 115 is shown in detail.

Assume a toggle position has occurred and the $\bar{Q}$ output of flip-flop 112 has gone from a high to a low state. This is applied to one input of a Nor gate 121. The delay circuit 115 causes a controlled rate of rise signal as determined by the RC time constant into inverted Schmidt trigger 120. The trigger output will go low approximately one hundred microseconds after the initial toggle of flip-flop 112. Up to this point in time, the output of Nor gate 121 remains in a low state if the third input, which is the PWM signal from voltage control network is high. When the PWM input goes low, the output of the Nor gate 121 will go high and remain there until any one of its three inputs returns to the high state.

The outputs of delay circuits 115, 116, and 117 are shown by the signals N, P, and R (FIGS. 2n, 2p and 2r).

Three additional delay circuits 115a, 116a, and 117a are utilized in conjunction with the positive switching modules 35, 36, and 37 of inverter 14. Each of these circuits comprise a resistance 118a and a capacitance 119a providing an input to an inverted Schmidt trigger 120a, a three input Nor gate 121a and a buffer-driver 122a. The Nor gate 121a receives a Q signal from flip-flop 112, a delayed and inverted $\bar{Q}$ signal, and a ground signal. Here the Q signal is delayed, while in circuits 115–117, the $\bar{Q}$ signals were delayed. The circuits 115a, 116a, and 117a are coupled to transistors 124, 125, and 126 respectively, which in turn, apply signals to control lines to 42, 43, and 44 of positive switching modules 35, 36, and 37.

The output signals of circuits 115a, 116a, and 117a, M, O, and Q are shown in FIGS. 2m, 2o, and 2q, respectively. The pulsewidth modulated signals are shown shaded. The time delay shown by the vertical dotted lines between signals M-N, O-P and Q-R, and QR represent time delays to insure that a phase is never short circuited.

By pulsewidth modulating an input of a Nor gate 121, where a low on the PWM signal is considered the ON condition, the output of the Nor gate is effectively pulsewidth modulated. The output of a Nor gate 121 is then put into a non-inverting buffer driver 121 and then utilized to drive negative switch modules 38, 39, and 40 in the inverter. In this manner, the negative switching modules of the inverter are switched at a rate dependent on the clock signal or selected frequency of operation and at a duty cycle dependent upon load conditions, while the positive switch modules are only statically switched in accordance with the clock signal. In this manner, the speed of the motor is controlled as a function of selected frequency and the motor voltage is controlled as a function of load current to maintain an essentially constant apparent power factor.

The rectangular switching signals of each individual phase S, T, and U applied to the phase lines S, T, and U are opposite in phase but with leading edges of one switching signal of an individual phase slightly delayed in time beyond the trailing edge of the opposite individual phase to eliminate the possibility of short circuiting a pair of switches of an individual phase. In this manner, circuit integrity of each individual phase is maintained.

An input is applied to buffer drivers 122 and 122a from circuit breaker 108a (FIG. 7), hereinafter described. If a fault or stop condition is called for, this input goes low and causes the output signal of the buffer-drivers to go low regardless of the input signal from Nor gates 121 or 121a. The incoming circuit breaker signal is normally high for operation and low for stop and overload condition. Under normal operating conditions, the high signal allows normal operation of all delay circuits via a buffer drive output from a transistor 125b. The high signal from the circuit breaker circuit provides base drive to transistor 125b via base resistor 125a, which drives transistor 125b into a saturation state, bringing its collector voltage low. Since the collector is tied to the reset input of flip-flops 112, 113 and 114, normal operations of the shift counter is allowed. If a fault occurs, or the controller is stopped, the incoming signal is low, which disables the output buffer-drivers 122, 122a of the delay circuits and also causes transistor 125b to turn off. The collector of transistor 125 then goes positive via resistor 127 which causes a reset of the entire shift counter, and shuts down the system.

The circuit breaker circuit 108a is shown in FIG. 7. The buss current signal derived from resistance 19 appears at terminal 19a. It is applied to voltage comparators 130 and 131 via a noise decoupling network comprising resistance 132 and capacitance 133. The incoming buss signal is compared with two threshold levels established by voltage dividers 134 and 135. Divider 134 establishes a threshold level should a positive going buss current signal (representing a regenerative condition) exceed a predetermined level. Divider 135 is tied to a negative supply-V to provide a negative threshold level should the current in line 13 (representing motoring current) exceed a predetermined value. The outputs of comparators 130 and 131 are Or'd to a transistor 136 which acts as a window detector. Transistor 136 provides a high output when the buss current signal is within the window. If either of comparators 130 or 131 turn on, transistor 136 saturates via resistance 137. Then current flows through resistance 138 turning on SCR 139. This turns on transistor 140 which turns off transistor 141 driving circuit breaker signal CB to zero at terminal 142. When this occurs, the system is shut down by turning off buffer-drivers 122, shown 5 in FIG. 8 and resetting flip-flops 112, 113, and 114.

Once SCR 139 has fired, the controller remains in a shut-down state until opto-isolator 89 in the Start-Stop/Reset circuit 83, FIG. 6 is again activated.

The circuit breaker circuit 108a is responsive to either motoring or regenerative current beyond predetermined window levels to actuate a system shutdown by deactivating the voltage processing network and hence the inverter.

Figure 9:
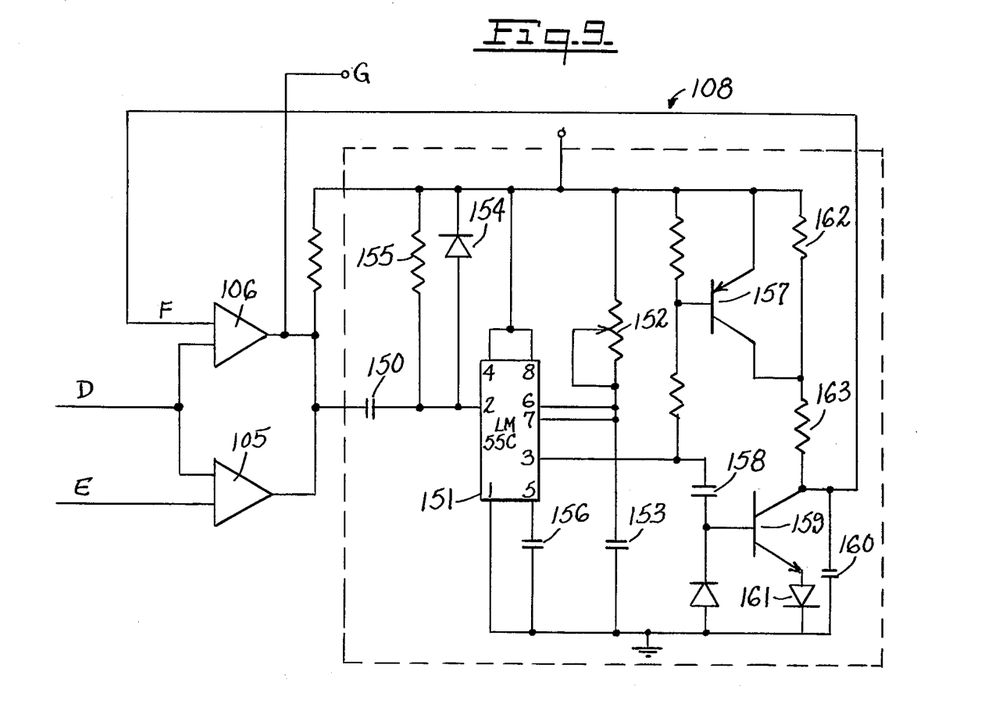
FIG. 9 is a schematic diagram of a voltage boost circuit of FIG. 7.

The low speed voltage boost circuit 108 shown in block form in FIG. 7, is shown schematically in FIG. 9. This circuit is utilized to generate the voltage in the boost area Z of FIG. 1.

On the negative going edge of PWM signal G from comparator 105, capacitance 150 passes a negative trigger pulse into a timer in the form of a LM555C integrated circuit 151 or equivalent. This circuit is used as a one shot oscillator, whose period is determined by resistance 152 and capacitance 153. A diode 154 clamps and discharges capacitance 150 when the PWM G signal goes high. Resistance 155 protects against false triggering, and capacitance 156 is used for time stabilization. Upon a triggering pulse on pin 2, output pin 3 goes high, cutting-off transistor 157. A positive going pulse via capacitance 158 turns on transistor 159 which discharges capacitance 160 to the forward voltage drop across diode 161 and the saturated voltage drop across transistor 159. As capacitance 158 charges, transistor 159 turns off, permitting capacitance 160 to begin charging at a rate determined by resistances 162 and 163. As the timer completes its "one-shot" period, the output goes low, saturating transistor 157. This effectively changes the charge rate of capacitance 160, (See FIG. 2f), increasing the rate of rise of voltage since the charge rate is controlled only by resistance 163. Charging of capacitance increases until the supply voltage is reached or another trigger pulse occurs to renew the cycle.

Figure 10:
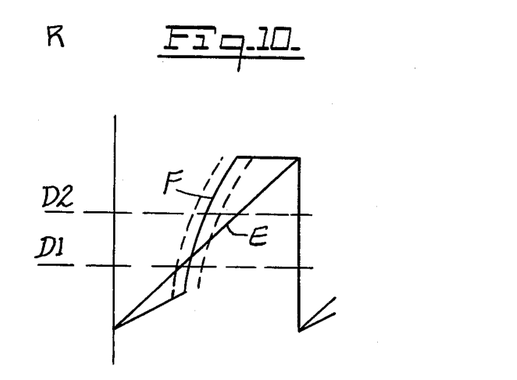
FIG. 10 depicts wave forms which control the pulse width modulation and implement the low-speed voltage boost.

Referring to FIGS. 2d, 2e, and 2f, there are three inputs D, E, and F to voltage comparators 105 and 106. The variation in signal F (shown in dotted line in FIG. 2f and FIG. 10) is due to adjustment of resistance 152. When signal D is below both of signals E and F, the PWM signal G is high. As analog signal D rises above signals E and F, the last to cross the amplitude of signal D on the rise of their leading edges will determine the width of signal G. This signal will effectively keep signal G low until the analog signal level D is exceeded. A comparison of the waveforms E and F is shown in FIG. 10. As the analog signal D rises in amplitude to D1, it crosses F last, therefore signal D will be width modulated by signal F. At amplitude D2, signal D crosses E last and is width modulated in accordance with E. The two-step configuration of signal F generates the low speed voltage boost since it operates below the ramp signal E in the beginning of each period. The rate is adjustable via resistance 152 up to a predetermined percentage, for example, twenty percent, of the signal D.

Therefore, the PWM signal G is a function of the clock, error signal C and the boost signal F.

At low motor speeds, this voltage boost signal provides a wider pulse G and therefore greater voltage to aid in starting high inertia loads.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In a control system for an alternating current motor having a switching means for switching connections of a DC supply to the windings of the motor at a rate which determines the speed of the motor and for a time duration which determines the power supplied to the motor, said switching occurring in response to pulses, means for supplying a pulse train in response to a speed signal, said pulse train having a frequency which determines the speed of the motor, and means responsive to said speed signal for providing a width modulated pulse for controlling the duty cycle of said switching means, the improvement comprising means for deriving a signal indicative of DC line current, means for comparing said speed signal and said current indicative signal and deriving an error signal, means for generating another pulsewidth modulated signal as a function of said error signal, and means for controlling the duty cycle of the switching means as a function of said another signal.

2. The system of claim 1 further including means for limiting the magnitude of said current indicative signal to a predetermined value greater than the value for rated voltage of the motor.

3. The system of claim 1 where said error signal is a DC signal and it is compared with a sawtooth signal to generate said another signal, and further including a circuit responsive to said another signal for generating a pulse signal having a first rate of rise and a second higher rate of rise, said pulse signal having frequency of said another signal, means for comparing said pulse signal with said DC signal and summing the result with said another signal whereby said another signal may be modified in pulsewidth if said pulse signal reaches the value of said DC signal after said sawtooth signal reaches the value of the DC signal.

4. The system of claim 3 where the first rate of rise of said pulse signal is less than the rate of rise of said sawtooth signal and the second rate of rise is greater than the rate of rise of said sawtooth signal.

5. The system of claim 1 further including means for monitoring the current from said DC source, and means responsive to said monitoring means for disabling said switching means if the current exceeds predetermined limits in either direction.

6. The system of claim 1 further including filter means disposed across said DC source, including a resistance and a capacitance, means for shorting said resistance, and means responsive to turn-on of said system for shorting said capacitance after a predetermined time delay.

7. A method of operating an n-phase inverter to supply an n-phase load from a DC source where the inverter comprises a first set of n-switches connected between the positive DC line and the n-phase load and a second set of n-switches connected between the negative DC line and the load, comprising the steps of generating n-pair of rectangular opposite phase switch signals for each load phase, delaying the rise time of the leading edge of the opposite phase signals of each phase so that the leading edges occur after the trailing edges of the opposite phase signal, pulsewidth modulating the signals to be applied to one of the sets of switches, applying the pulsewidth modulated signals to one set of switches, applying the opposite non-pulse modulated phase signals to the other set of switches, whereby the non-pulse modulated signals determine the frequency applied to the load, and the pulsewidth modulated signals determine the voltage applied to the load.

8. A control system for energizing an AC motor from a DC source comprising means for producing a pulse signal proportional in frequency to a desired motor speed, an inverter comprising a first n switching means connected between a positive buss and the motor and a second n switching means connected between the motor and a nagative buss, a ring counter responsive to said pulse signal producing means for providing n pair of pulse train waveforms for selectively switching the switching means of said inverter to provide energy to said motor, 2n gating circuits adapted to receive the pulse train waveforms of said ring counter and provide control signals to said switching means, a first n of said gating circuits receiving an output and an inverted NOT output from said ring counter, a second n of said gating circuits receiving a NOT output and an inverted output from said ring counter, means connecting the output of one of said first n gates to a corresponding one of said first n and second n switching means, means connecting the output of the second n gates to a corresponding one of the other of said first n and second n switching, whereby one of the sets of n gates will cause one of said n switching means to switch at a rate which determines motor speed, the other set of said n gates receiving a pulse modulated signal indicative of voltage to be applied to the motor, whereby the output of said other set of n gates determines the voltage applied to said motor.

9. The system of claim 8 wherein each of said gating means comprises a delay circuit for delaying one of said counter output and NOT outputs applied thereto.

10. The system of claim 8 wherein each of said gating circuits further includes an output inhibit circuit, said inhibit circuit being responsive to DC buss current to block outputs of said gates if said buss current is beyond predetermined limits.

11. An arrangement for providing width modulated pulses in accordance with the magnitude of a DC signal comprising a sawtooth waveform generator, a first voltage comparator, means for applying the DC signal and the sawtooth waveform to said first voltage comparator, means responsive to the output of said comparator for generating a two ramp pulse waveform having essentially the same period as the period of the sawtooth waveform and coincident in time therewith, said two ramp pulse waveform having a first leading edge of lesser rate of rise than said sawtooth waveform and a second ramp portion having a rate of rise greater than said sawtooth waveform, second voltage comparator, means for applying said DC signal and said two ramp pulse waveform to said second comparator, said comparators having outputs coupled together and providing a width modulated pulse dependent upon coincidence of the level of said DC signal and one of said sawtooth waveform and said two ramp pulse waveform.

12. An improved multiphase AC motor control system of the type having a means responsive to a speed signal for generating a first pulse train with a frequency which determines the speed of the motor, a means for generating a pulse train of PWM pulses, and a master switching means responsive to the first pulse train for controlling the speed of the motor and responsive to the pulse train of PWM pulses for controlling the power supplied to the motor, and wherein the master switching means comprises a first switching means for connecting the motor to a first terminal of a DC power supply and a second switching means for connecting the motor to a second terminal of the DC supply; the improvement comprising, means for generating a signal indicative of DC power supply current, means for modulating the width of the pulses in the pulse train of PWM pulses responsive to the current indicative signal and responsive to the speed signal, and wherein only one of the first and second switching means is responsive to the PWM pulses for controlling the power supplied to the motor and both of the first and second switching means are responsive to the first pulse train for controlling the speed of the motor.

13. The improved AC motor control system of claim 12 wherein the switching means which is not responsive to the PWM pulses comprises a power transistor connected between the DC power supply and the motor, a second transistor connected between the collector of the power transistor and the base of the power transistor in a Darlington configuration, and a base clamp resistor connected between the base and the emitter of the power transistor.

* * * * *

UNITED STATES PATENT AND TRADEMARK OFFICE
CERTIFICATE OF CORRECTION

PATENT NO. : 4,465,961

DATED : August 14, 1984

INVENTOR(S) : Paul J. Landino

It is certified that error appears in the above-identified patent and that said Letters Patent are hereby corrected as shown below:

Column 8, line 53 delete ", and QR"

Column 8, line 60 delete "121" and substitute -- 122 --

Column 9, line 32 delete "125" and substitute -- 125b --

Column 9, line 57 delete the number "5"

Signed and Sealed this

Twenty-second Day of January 1985

[SEAL]

Attest:

DONALD J. QUIGG

Attesting Officer

Acting Commissioner of Patents and Trademarks